(12) United States Patent
Mazzarella (10) Patent No.: US 12,010,212 B2
(45) Date of Patent: *Jun. 11, 2024

(54) CONSENSUS-BASED VOTING FOR NETWORK MEMBER IDENTIFICATION EMPLOYING BLOCKCHAIN-BASED IDENTITY SIGNATURE MECHANISMS

(71) Applicant: Mutualink, Inc., Wallingford, CT (US)

(72) Inventor: Joseph R. Mazzarella, Tolland, CT (US)

(73) Assignee: MUTUALINK, INC., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,964

(22) Filed: Mar. 6, 2023

(65) Prior Publication Data
US 2023/0208613 A1    Jun. 29, 2023

Related U.S. Application Data

(63) Continuation of application No. 17/087,428, filed on Nov. 2, 2020, now Pat. No. 11,601,256, which is a
(Continued)

(51) Int. Cl.
*H04L 9/06* (2006.01)
*G06F 16/27* (2019.01)
(Continued)

(52) U.S. Cl.
CPC ............ *H04L 9/0637* (2013.01); *G06F 16/27* (2019.01); *G06F 16/285* (2019.01);
(Continued)

(58) Field of Classification Search
CPC ... H04L 9/0637; H04L 9/0643; H04L 9/3247; H04L 63/08; H04L 2209/38; G06F 16/27; G06F 16/285
See application file for complete search history.

(56) References Cited

U.S. PATENT DOCUMENTS 9,635,000 B1    4/2017 Muftic
10,237,259 B2 *  3/2019 Ronda ................... H04L 9/3247
(Continued)

FOREIGN PATENT DOCUMENTS

WO    WO 2006/094228 A2    9/2006

OTHER PUBLICATIONS

International Search Report and Written Opinion of the International Search Authority directed to related International Patent Application No. PCT/US2019/054311, dated Dec. 26, 2019, 9 pages.
(Continued)

*Primary Examiner* — Stephen T Gundry
(74) *Attorney, Agent, or Firm* — Sterne, Kessler, Goldstein & Fox P.L.L.C.

(57) ABSTRACT

A communication method and a method for operating the communication network are disclosed. The method includes: obtaining a network identifier (NI) for a first member of the communication network, where the first member is un-validated and associated with a first user; obtaining a vote value regarding the first user from a second user of a second member in the communication network, where the second member is validated; generating a trust score for the NI based on the vote value; and validating the first member, in response to the trust score satisfying a trust score threshold, by inserting a first validated member identity hash block (MIHB) based on the NI into a master blockchain ledger for the communication network.

20 Claims, 7 Drawing Sheets

Related U.S. Application Data continuation of application No. 16/813,320, filed on Mar. 9, 2020, now Pat. No. 10,826,683, which is a continuation of application No. PCT/US2019/054311, filed on Oct. 2, 2019.

(60) Provisional application No. 62/740,020, filed on Oct. 2, 2018.

(51) Int. Cl.
  *G06F 16/28* (2019.01)
  *H04L 9/32* (2006.01)
  *H04L 9/40* (2022.01)
  *H04L 9/00* (2022.01)

(52) U.S. Cl.
  CPC .......... *H04L 9/0643* (2013.01); *H04L 9/3247* (2013.01); *H04L 63/08* (2013.01); *H04L 9/50* (2022.05)

(56) References Cited

U.S. PATENT DOCUMENTS

| | | | |
|---|---|---|---|
| 10,284,379 B1* | 5/2019 | Muftic | H04L 9/3265 |
| 10,311,250 B2 | 6/2019 | Khi | |
| 10,447,664 B2* | 10/2019 | Haldenby | H04L 9/14 |
| 10,452,863 B2 | 10/2019 | Miller | H04W 12/02 |
| 10,454,927 B2* | 10/2019 | Oberhauser | G06F 21/62 |
| 10,521,623 B2 | 12/2019 | Rodriguez | |
| 10,594,689 B1* | 3/2020 | Weaver | H04L 9/3242 |
| 10,826,683 B2 | 11/2020 | Mazzarella | |
| 2015/0332283 A1* | 11/2015 | Witchey | G06F 21/00 705/3 |
| 2016/0156593 A1 | 6/2016 | Yan | |
| 2017/0031676 A1 | 2/2017 | Cecchetti et al. | |
| 2017/0033932 A1 | 2/2017 | Truu et al. | |
| 2017/0046526 A1 | 2/2017 | Chan | |
| 2017/0046638 A1 | 2/2017 | Chan | |
| 2017/0054611 A1* | 2/2017 | Tiell | G06Q 30/0631 |
| 2017/0111175 A1 | 4/2017 | Oberhauser | |
| 2017/0132626 A1* | 5/2017 | Kennedy | G06Q 20/065 |
| 2017/0230791 A1 | 8/2017 | Jones | |
| 2017/0250972 A1 | 8/2017 | Ronda | |
| 2017/0270527 A1 | 9/2017 | Rampton | |
| 2017/0286717 A1 | 10/2017 | Khi | |
| 2017/0346639 A1 | 11/2017 | Muftic | |
| 2018/0075247 A1 | 3/2018 | Campero | |
| 2018/0101560 A1 | 4/2018 | Christidis | |
| 2018/0130061 A1 | 5/2018 | Caldera | |
| 2018/0173906 A1 | 6/2018 | Rodriguez | |
| 2018/0336286 A1* | 11/2018 | Shah | G06F 1/163 |
| 2018/0343120 A1* | 11/2018 | Andrade | H04L 9/0866 |
| 2018/0351747 A1* | 12/2018 | Spangemacher | H04L 63/126 |
| 2019/0036887 A1 | 1/2019 | Miller | |
| 2019/0036906 A1* | 1/2019 | Biyani | H04L 63/102 |
| 2019/0073646 A1* | 3/2019 | Wright | G06Q 20/3827 |
| 2019/0089701 A1* | 3/2019 | Mercury | G06F 30/20 |
| 2019/0092279 A1* | 3/2019 | Jarvis | H04L 9/3297 |
| 2019/0108362 A1 | 4/2019 | Miller | |
| 2019/0122149 A1* | 4/2019 | Caldera | H04L 63/102 |
| 2019/0132350 A1* | 5/2019 | Smith | G06Q 20/40 |
| 2019/0147431 A1* | 5/2019 | Galebach | H04L 9/3247 705/44 |
| 2019/0166095 A1 | 5/2019 | Tobin | |
| 2019/0222575 A1 | 7/2019 | Oberhauser | |
| 2019/0222576 A1 | 7/2019 | Yan | |
| 2019/0229930 A1 | 7/2019 | Haque | |
| 2019/0236598 A1 | 8/2019 | Padmanabhan | |
| 2019/0243988 A1* | 8/2019 | Khi | G06F 16/903 |
| 2019/0266178 A1 | 8/2019 | Madhavan | |
| 2019/0319808 A1 | 10/2019 | Fallah | |
| 2019/0384935 A1* | 12/2019 | Miller | H04L 63/104 |
| 2019/0386969 A1 | 12/2019 | Verzun | |
| 2020/0036707 A1 | 1/2020 | Callahan | |
| 2020/0119921 A1* | 4/2020 | Rodriguez | H04L 63/102 |

OTHER PUBLICATIONS

Supplementary Partial European Search Report, dated Jun. 1, 2022, for European Patent Appl. No. 19869757.5, 13 pages.

\* cited by examiner

CONSENSUS-BASED VOTING FOR NETWORK MEMBER IDENTIFICATION EMPLOYING BLOCKCHAIN-BASED IDENTITY SIGNATURE MECHANISMS

CROSS REFERENCE

This application is a continuation of U.S. patent application Ser. No. 17/087,428 entitled, "Consensus-Based Voting for Network Member Identification Employing Blockchain-Based Identity Signature Mechanisms," filed on Nov. 2, 2020, which is a continuation of U.S. patent application Ser. No. 16/813,320 entitled, "Consensus-Based Voting for Network Member Identification Employing Blockchain-Based Identity Signature Mechanisms," filed on Mar. 9, 2020, which is a continuation of International Application No. PCT/US2019/054311 entitled, "Consensus-Based Voting for Network Member Identification Employing Blockchain-Based Identity Signature Mechanisms," with an international filing date of Oct. 2, 2019, which claims priority from U.S. Provisional Application No. 62/740,020 filed on Oct. 2, 2018, all of which are incorporated herein by reference.

BACKGROUND

Field of the Invention

Disclosed herein is a system and method for authenticating and verifying the identity of members within a network, and for authenticating and verifying changes in network directory-related identity attributes, using consensus-based voting and employing blockchain-based identity signature mechanisms.

Background

In any closed membership network, a new member may only join the network if the member meets the qualifications and/or satisfies the conditions of membership. These qualifications may be based upon certain characteristic or properties that are part of or are associated with a member.

In communication networks where endpoint members are permitted or enabled to communicate with other endpoint members in the network, closed network domain attributes may likewise be imposed by restrictions upon endpoint membership through network access and membership qualification. Membership, access, and use of a communications network when subject to a priori restriction are commonly referred to by many names including "private networks," "closed networks," "restricted access networks," "privileged access networks," "enclaved networks," among other names. Additionally, even with a private network, certain members may have special status or privileges not available to other members generally, creating subnetworks, subdomains or special access areas. This effectively represents a subset of the larger set of network users, and the subset of members may possess one or more other shared characteristics or properties that qualify them for subset membership.

In the case of any network, the problems associated with determining whether an entity is qualified to be a member in the network are multi-fold. The first problem is that a proposed new member must possess the necessary attributes or properties of membership for qualification. These qualifying attributes are often required not only for network membership joinder but also for ongoing validation of membership status and privilege to access or use of the network. Typically, proof of qualification requires the presentment of prescribed information that asserts proof of qualification. These predicate proofs may be documentation generated or produced from other pre-existing organizations, systems or events that are deemed or assumed to have credibility. Each predicate proof is presumed to be trusted either in itself or in combination with other documentary proofs and either with or without other confirmatory processes or actions. A common example are the documents required for issuance of a driver's license. A common documentary proof requirement of an applicant for a driver's license may include a certified copy of a birth certificate, a current copy of a bill with a residence address, and a photo identification document such as a valid passport. When presented, the proofs must be authenticated to determine their validity. The validity of any assertion of proof is generally at least twofold. First, the document or other medium bearing the information must be determined to be genuine (i.e., not forged or altered). Second, if being a facially genuine document, then it must be determined whether that document was issued or obtained without fraud. When sufficient validating proofs are presented and confirmed, a form of credential will issue, such as driver license, which can be a uniquely representative instrument, document, token, symbol, or set of information that indicates membership and membership identity.

The second problem is that credential when presented must be validated as authentic. In other words, the credentials, if conditionally based, such as being valid for a period of time, must be validated against the conditions of validity, and they cannot be forged.

The third problem is if the credentials are associative, meaning they are associated with a person or thing, the association must be valid.

In communication networks the authenticity of a member endpoint can be validated through several means. These include validation when an endpoint is permitted access to a network by entering an asserted identity and entering a valid passcode associated with the identity. When input, the credentials are sent to an agent, typically a server or other computing device, that performs a validation function against a data store to determine the validity of the credentials for purposes of allowing access to or for performing permitted functions on the network. Often in conventional communications networks user passwords and login credentials are relationally associated with a directory which stores the member's endpoint network address and publishable or discoverable identity information. This information may be accessed by other network members in order to send communications to the recipient member. Likewise, when an endpoint member sends a message to an intended recipient, the identity of the sending member can also be transmitted using the directory.

The above authentication and validation process can be made secure by employing well known and understood private-public key or symmetrical key encryption schemes in conjunction with an agent acting as a certificate authority (CA).

In any closed network where membership is restricted by the imposition of qualification parameters and identity is an express or implied conditional construct, a network's purpose, reliability, secrecy, and/or vulnerability can be compromised where membership qualification, credentials, and/or the identity associated with the member is falsified or misappropriated. This can occur in the root chain of the credential and identity authentication and validation. Misappropriation and falsification can occur in any number of ways including employing various social engineering techniques and digital spoofing techniques. In the case of identity verification for individuals, verification can be accomplished through cross-reference checks of independent identity data. This includes requiring physical presentment of a driver's license or other photo identification for visual verification of the subject against the identification image. Other biometric validation processes can be employed, including fingerprint, iris scans, voice authentication, facial recognition, and DNA sampling comparison against a preexisting data store.

The unique challenges presented in a closed network are devising a system where authenticity of credentials and identity can be assured when joining a network and while being a member of the network, detecting falsification or misappropriation, and validating changes in related directory information. In the case of multi-agency public safety and emergency communications networks, the ability to authenticate and assure membership qualification is of critical importance since the nature of the information exchanged is sensitive and can impair network communications because of unauthorized parties accessing, transmitting, or interfering with valid communications.

In enterprise networks where users or endpoints are affiliated or under the administrative control of an enterprise network agent, client-server based directory systems such as Lightweight Directory Access Protocol (LDAP) or RADIUS based authentication and accounting protocols such as Password Authentication Protocol (PAP), challenge handshake authentication protocol (CHAP), and extensible Authentication Protocol (EAP) are used, and the enterprise can validate and authenticate based on the attribute factors or criteria established in the authentication policy. However, initial authentication associated with initial membership qualification is commonly established by some form of physical or visual inspection of the user and/or or associated validating documentation to confirm identity. Once an identity is asserted and validated, a unique identification or credentials may be issued or generated. Often this involves the use of enterprise issued identification cards with user photos. These identification cards also may serve other functions such as an electronic key card access and may be used as a single or part of a multi-factor authentication for computer or device access.

However, in the case of public safety agencies that are interoperating with each other, or other enterprises interoperating operating with each another, there is not necessarily a common or shared validation method and authentication scheme ensuring the same level of scrutiny or standard of proof. Typically, cross-agency authentication is presumed by asserted identity and users associated with an agency are assumed to be a part of the trusted chain of the agency with which they are associated. For example, in a network of only law enforcement agency members, Police Department A will trust the identity of Police Department B based on the network directory based assertion that Police Department B is who it asserts to be based on the presumptive membership qualification validation function invoked when Police Department B joined the network ("Membership Qualification Validation" or "MQF"). Moreover, associated endpoints or users of Police Department B are assumed to be authentic by the inference arising out of the presumed authentication criteria imposed by Police Department B to be a user or endpoint within Police Department B's network or security domain. Thus, a user identifying himself as John Doe of Police Department B is deemed to be a valid identity of a user of Police Department B.

BRIEF SUMMARY

One or more embodiments relate to a method for operating a communication network. The method comprises: obtaining a network identifier (NI) for a first member of the communication network, wherein the first member is un-validated and associated with a first user; obtaining a vote value regarding the first user from a second user of a second member in the communication network, wherein the second member is validated; generating a trust score for the NI based on the vote value; and validating the first member, in response to the trust score satisfying a trust score threshold, by inserting a first validated member identity hash block (MIHB) based on the NI into a master blockchain ledger for the communication network.

One or more embodiments relate to a method for operating a communication network. The method comprises: obtaining an identity attribute of a suspect user in the communication network; obtaining an identifying attribute of a suspect member associated with the suspect user; determining that suspect member is validated based on the identifying attribute and a master blockchain ledger for the communication network; obtaining, in response to determining that the suspect member is validated, a member blockchain ledger of the suspect member; determining, by a first member node associated with a first member, that the member blockchain ledger comprises the identity attribute of the suspect user; and classifying, in response to determining the member blockchain ledger comprises the identity attribute, the suspect user as trusted.

One or more embodiments are related to a system. The system comprises: a master blockchain ledger associated with a communication network; a relational ledger configured to store an un-validated member identity hash block (MIHB) comprising a network identifier (NI) for a first member of the communication network, wherein the first member is un-validated and associated with a first user; a trust tabulation engine configured to: obtain a vote value regarding the first user from a second user of a second member in the communication network, wherein the second member is validated; and generate a trust score for the NI based on the vote value; and a master blockchain controller configured to: compare the trust score with a trust threshold value; and validate the first member, in response to the trust score satisfying the trust threshold value, by inserting a validated MIHB based on un-validated MIHB into the master blockchain ledger.

DETAILED DESCRIPTION

Disclosed herein is a system and method for authenticating and verifying the identity of members within a network, and for authenticating and verifying changes in network directory-related identity attributes. Because existing networks employ well-known techniques for authenticating and verifying members, networks security measures are often circumvented and network security may be compromised. The disclosed system and method integrates and employs certain aspects of cryptography, blockchain or distributed ledger technology, and consensus voting to improve, over existing networks, the accuracy of authenticating membership (that of both new and existing members or nodes of the network) and verifying changes in network directory-related identity attributes, which increases network security. In one embodiment, multi-agency public safety and emergency communications networks employ cryptography, blockchain technology, and consensus voting to authenticate and verify new members or nodes of the network, allowing the new members or nodes to participate on the network and interact with other members or nodes. In this embodiment, the network may further authenticate and verify membership of existing members or nodes, and authenticate and verify any changes in network directory-related identify attributes. The techniques described herein may be implemented in hardware, software, or a combination of hardware and software to increase network security and assure identity in peer networks.

Open ledger, blockchain-based systems allow for secure, publically authenticatable block transactions, including block processing and recording. These systems create immutable records of transactions. These systems have been employed for virtual or digital currency and unique token identity when coupled to various proof of work algorithms employing one-way encryption techniques and methods. Blockchains may employ consensus algorithms other than proof of work, such as proof of stake. Generally, it is a well known and recognized problem that proof-based, blockchain open ledger systems have transactional processing rate limitations, which arise from the speed and processing power required to "mine" a nonce and the associated information block associated with a nonce is prescribed by the community blockchain software. Additionally, transactions recorded within a block are filled in at the discretion of the block promoter without regarding order, size, or other real-world ordinal considerations. Furthermore, in the case of real time networks where the online presence or status of a member on a network, their current network address (either directly or through a proxy), and/or location is to be discoverable, conventional block chain implementations lack the speed necessary to capture and promote a member's status and furthermore in conventionally distributed shared ledger the communication overhead with communicating changes in state to other members by publishing an updating copies of ledgers is inefficient. As a consequence, use of current blockchain and open ledger systems as presently conceived are regarded as having no readily apparent applicability to real time communications networks. A blockchain implementation may be public, where any member of the public may participate in mining and adding blocks to the public ledger. Other blockchain implementations may be permissive, where only certain participants are allowed (have permission) to mine and add blocks to the ledger, which may be public or may also have certain viewing restrictions. The system and method described herein may be implemented using public or permissive blockchains.

Consensus-based voting for network member identification employing blockchain-based identify signature mechanisms, in accordance with one embodiment, is described below. The system and method disclosed herein may employ any consensus algorithm, including, but not limited to, proof of work and proof of stake. The member identification techniques disclosed herein may be implemented in multi-agency public safety and emergency communications networks, or any other network where membership qualification or identity is required, to increase network security.

An example system in accordance with the current disclosure of consensus-based voting for network member identification may include one or more computers, such as one or more servers. The system includes computer readable memory. The system includes a relational database (including a relational data structure or relational ledger), a blockchain database (including a blockchain data structure or blockchain ledger), an Authentication Module ("AM"), a Trust Messaging Module ("TMM"), and a Trust Tabulation Module ("TTM"). The AM, TMM, and TTM may be implemented in software or in hardware or in a combination of hardware and software.

The blockchain ledger may be initiated for a communication network using the following technique. A root encryption hash representing a first network signature instantiation may be generated. This root encryption hash may be derived from an arbitrary nonce of a prescribed size coupled with a network identification string of a prescribed size known as a "Genesis Block." The network identification string may be formed from any relevant data including the network name space, date and time of network instantiation, a location, a first creator identity, a MAC address of one or more routing or other machine elements in network, first member or members IDs of the network, etc. The Genesis Block is the first entry on the blockchain ledger.

Following the Genesis Block, the blockchain ledger records Validated Member Identity Hash Blocks ("Validated MIHB") as data records. That is, each successive block added to the blockchain ledger is a Validated MIHB, which is recorded and stored on an ordered basis once the block achieves the requisite trust validation level to be considered a Validated MIHB, as discussed in more detail below.

The relational ledger stores Un-validated Member Identity Hash Blocks ("Un-validated MIHB"). Un-validated MIHBs are recorded and stored in the relational ledger on an ordered basis. Un-validated MIHBs may be removed from the relational ledger once the requisite trust validation level of the MIHB achieves a predetermined level, at which time Un-validated MIHB becomes a Validated MIHB, as discussed in more detail below.

Next, a technique for joining a communication network according to this disclosure is described. Each new member upon joining the network may be assigned a unique Network Identity ("NI"), which may be comprised of one or more of the following: (a) at least a unique endpoint identifier which may be a user name, network directory name, an agency or organization name, a network address, a geographic location, a telephone number, an email address, or any other data this is associatively distinct either itself or in combination with other data in relation to the endpoint member identity; and (b) a unique validating attribute or attributes which may be a user or randomly generated passcode, phrase or series of response inputs to a challenge and answer protocol, being comprised of an alphanumeric string or series of strings either alone or which may be in combination with a machine access code address, user biometric signature digital input, an encrypted private or public key or firmware based encryption key associated with the host device of the endpoint, a location or other similar information or data; and (c) the unique identifying attributes may be one or more attributes required as a condition to joining the network as a member and may be one or more required validating attributes.

The Network Identity may be input into an encrypted hash function, outputting a hash string representing an identity, which may be referred to as a Member Identity Hash Block ("MIHB"). The encrypted hash function may be a one-way hashing encryption function, such as SHA3 hash encryption function.

A new MIHB may be transmitted to the Authentication Module, which may be a software module residing on a computer or server in the network. The Authentication Module receives the new MIHB and performs a hash operation using as input at least the following: (i) the hash value of the most recent block appended to the blockchain ledger (which is a Validated MIHB) and (ii) the MIHB value. If the new MIHB is the first member of the network, the most recent block of the blockchain ledger is the Genesis Block and the Authentication Module uses the hash value of the Genesis Block. The output of this hash operation may be referred to as an Un-validated MIHB, which is comprised of at least an Un-validated MIHB hash value, the hash value of the most recent block appended to the blockchain ledger (that is, the hash value of the Validated MIHB used as input to the hash operation), and the MIHB.

At this point, the Un-validated MIHB is considered untrusted. Un-validated MIHBs may be transmitted to the relational ledger, where it may be recorded and stored on an ordered basis. When the Un-validated MIHB is transmitted to the relational ledger it may be associated with the Network Identity assigned to the new member.

A proposed network member with an un-validated MIHB may be admitted as an authenticated member by the network owner through an administrative function by converting the un-validated MIHB to a validated MIHB and adding it to the network's blockchain ledger, or may be admitted as a member of the network with access to network functions as an un-validated member.

When a new member of the network with an Un-validated MIHB enters into a first communication session with any other member of the network or any other session event on the network, a trust message may be sent from either the new member's endpoint directly or indirectly via a Trust Messaging Module ("TMM"), which may be a software module residing on a computer or server in the network. The TMM may be received by the one or more other receiving endpoints that are parties to the communication session. The TMM may be displayed in an audible or visual manner within the recipient endpoint user interface indicating the trust status of the sending endpoint. For example, sending and receiving endpoints may be smartphones, and the TMM may display on the screen of the receiving smartphones the trust status of the party associated with the sending smartphone.

The trust status of a member endpoint may be calculated by a Trust Tabulation Module ("TTM") and expressed as a scalar value or series of values which correspond with a threshold level or levels of trust. The TTM may be software residing on a computer or server in the network utilizing one or more types of scalar data, factors, and associated calculation methods intended to signify a relative state of trust. Calculations consist of various functions based upon single variable or multivariate algorithms, static or dynamic statistical models and variance analysis, heuristic interference models, stochastic analysis, eigen decomposition, or neural net based artificial intelligence assessments utilizing any quantifiable data or information, including communication frequency, frequency in communications among distinct other members or groups of members, location, network organization, MAC address, cell tower or relay location, delay time, IP header meta data, encoding scheme, client login or password attempts, file or data corruption events or rates, virus signatures, code injection events, and other member trust rating or votes. In one embodiment a trust range is assigned a corresponding scalar range in which one more threshold values are set. Other members may cast votes based upon trust values choices or ratings, and the choices or ratings may be correlated to a series of symbolic descriptors or number values within a defined range. For example, a five-step graduated trust scale may be employed where one member may vote on the trustworthiness of another member's asserted identity by selecting and transmitting a corresponding trust assessment with a value of 1, being least trusted, to the value of 5, being most trusted. When a sufficient collection of votes is received regarding a member, the average value of the vote values transmitted be calculated by an agent, and the average value used to ascertain the members trust level within the network. This process may occur in a network transaction context.

For example, upon the conclusion of a session or termination of a network member's participation in a session, an interactive message may be displayed in the endpoint member's user interface requesting a vote input, which may be a series of voting choices confirming or questioning the identity of the endpoint. When a choice is selected, the vote value and the MIHB is sent. The TTM may calculate the total voting values received from the participant members with respect to the session transaction. The voting value is then recorded and stored in the relational ledger associated with the MIHB or NI of the untrusted or un-validated member for whom the votes were cast, and the TMM updates the cumulative value of votes cast for the subject member.

There may be assigned to the network or subsets thereof a trust scale to which a network member's cumulative voting value may be applied. There may be a threshold value for verified trust established, which when a member's cumulative vote value equals or exceeds the trust threshold value, the member's MIHB is deemed trusted and verified, and the status converted from an Un-validated MIHB to a Validated MIHB. This may occur when a TMM updates the cumulative value of votes cast for the subject member and compares the cumulative value of votes to the threshold value and if equal or exceeding the value sends an instruction to message to the TTM. The Validated MIHB may be appended to the blockchain ledger.

If a member's directory information is changed or modified, there may be an algorithmic function module which is triggered on the change and which resets or adjusts a member's cumulative vote value based on the type of changes to the directory. Upon a change, a new MIHB is generated and sent to the relational ledger. The new MIHB hash is recalculated and derived from the member's MIHB prior to the change, which is located in the blockchain ledger. The new MIHB is then classified as an Un-validated MIHB and subject to revalidation using the above voting process.

The system described herein may employ any number of algorithmic weighted voting schemes and voting value calculations based on one or more parameters including, based on: (a) The relative trust values of voting members within the network; (b) Number of different votes cast by distinct members; (c) The duration of network membership with a Verified Member Hash Blocks in effect (d) Frequency of use of the network as measured by number of sessions, duration of sessions, or similar metrics (e) The duration of time a client endpoint device has been registered access the network or used the network (f) The position, ranking or privileged level of an end-user identity (g) Proximate location of the member at the time of voting or in relation to other related members (h) The network address transmitted by a member when voting or in session.

Figure 1:
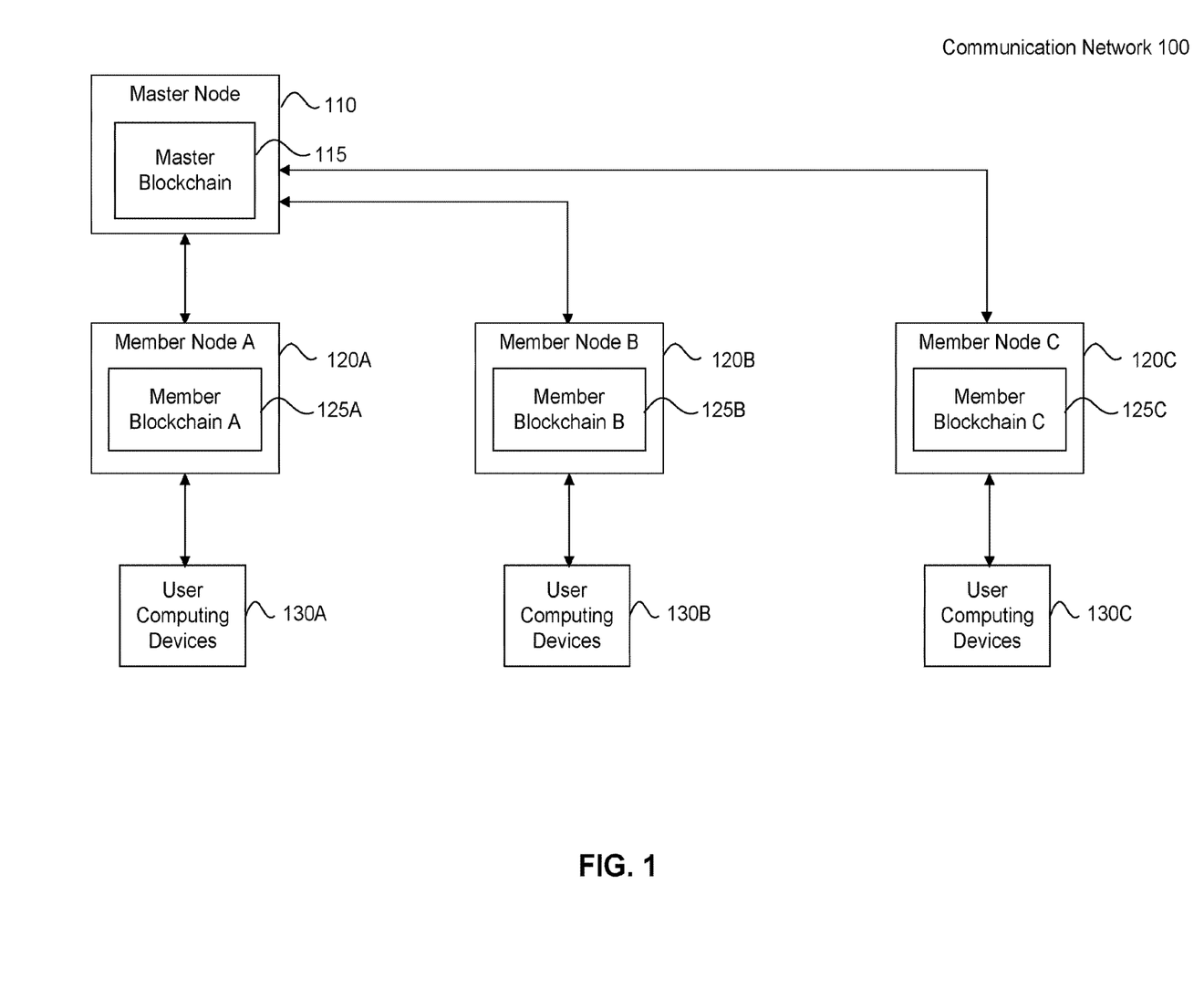
FIG. 1 shows a communication network in accordance with one or more embodiments.

FIG. 1 shows a communication network (100) in accordance with one or more embodiments. As shown in FIG. 1, the communication network (100) has multiple nodes including a master node (110) and multiple member nodes (e.g., member node A (120A), member node B (120B), member node C (120C)). Each node (e.g., 110, 120A, 120B, 120C) may correspond to one or more computing devices (e.g., mainframes, servers, routers, personal computers (PC), tablet PC, smartphones, a network of computing devices, etc.) that exchange data using wired and/or wireless channels. Moreover, each node (110, 120A, 120B, 120C) may exchange data with other nodes (110, 120A, 120B, 120C) using wired and/or wireless channels. The data may be encrypted before transmitting it to another node (110, 120A, 120B, 120C).

In one or more embodiments, each member node (120A, 120B, 120C) corresponds to a member (e.g., a business entity, a governmental agency or department, a military agency, a charitable organization, an academic institution, a public safety agency, a police department, a fire department, an emergency medical services provider, etc.). For example, member node A (120A), member node B (120B), and member node C (120C) correspond to member A, member B, and member C, respectively. Each member may have one or more users or end users (e.g., employees, contractors, volunteers, students, etc.). End users may operate user computing devices to exchange data with the nodes (110, 120A, 120B, 120C) and/or to communicate with other users belonging to the same member or a different member. For example, end users of member A may operate one set of user computing devices (130A), end users of member B may operate another set of user computing devices (130B), and end users of member C may operate yet another set of user computing devices (130C).

In one or more embodiments, each member is assigned a Network Identity ("NI"), as discussed above. A revised NI may be generated when one or more attributes within the NI are added, removed, modified, etc. One or more attributes of the NI or revised NI may be hashed.

Still referring to FIG. 1, the master node (110) includes a master blockchain (115). One or more blocks in the master blockchain (115) may include the NI of a member, as well as any additional information about the member. The master blockchain (115) maintains a record of validated or trusted members, discussed below. In the event that a member changes and modifies its NI, that member may be removed from the master blockchain until it is revalidated, as discussed below. Parties that have not been validated, e.g., un-validated parties, are not recorded on the master blockchain until they pass the validation process.

As also shown in FIG. 1, each member node (120A, 120B, 120C) includes a member blockchain (e.g., member blockchain A (125A), member blockchain B (125B), member blockchain C (125C)). In one or more embodiments, a member blockchain (125A, 125B, 125C) stores the NI for the member. The member blockchain consists at a minimum of a root block, which may be derived from the NI (or a hash of the NI). In one or more embodiments, a member blockchain (125A, 125B, 125C) stores identity information (e.g., name, email address, phone number, MAC address, IP address, etc.) for each user belonging to the member. In one or more embodiments, a member blockchain ledger (125A, 125B, 125C) also stores identity information for previous users of the member (e.g., retired employees, terminated employees, graduated students, etc.).

As a non-limiting example, member node A is operated by the Washington County police department. The network administrator of the Washington County police department may maintain member blockchain A, such as add or new officers or employees to the blockchain. The network administrator may also remove past employees, such as employees that have retired or have been fired, by including in a block an indication that the employee is no longer employed by the Washington County police department.

The master blockchain 115 and one or more member blockchains, e.g., member blockchain 120A, may be used during a communication session to assess trust between end users, who may not know each other (such as officers from different police departments that have never met). Before or during a communication session (e.g., email, instant messaging, phone call, texting, file transfer, etc.) with an unknown end user, it is desirable to classify the unknown end user as "trusted" or "untrusted." A "trusted" user may also be referred to as an authenticated user. This classification/authentication may be accomplished using both the master blockchain (115) and a member blockchain (120A, 120B, 120C). Specifically, if the unknown end user belongs to a validated member (i.e., the master blockchain (115) includes the NI of the member) and if the identity information of the unknown end user is stored in the member blockchain (125A, 125B, 125C) of the validated member, the unknown end user may be trusted, or at least have a higher level of trust, than an unknown end user that is not associated with a validated member.

Figure 2:
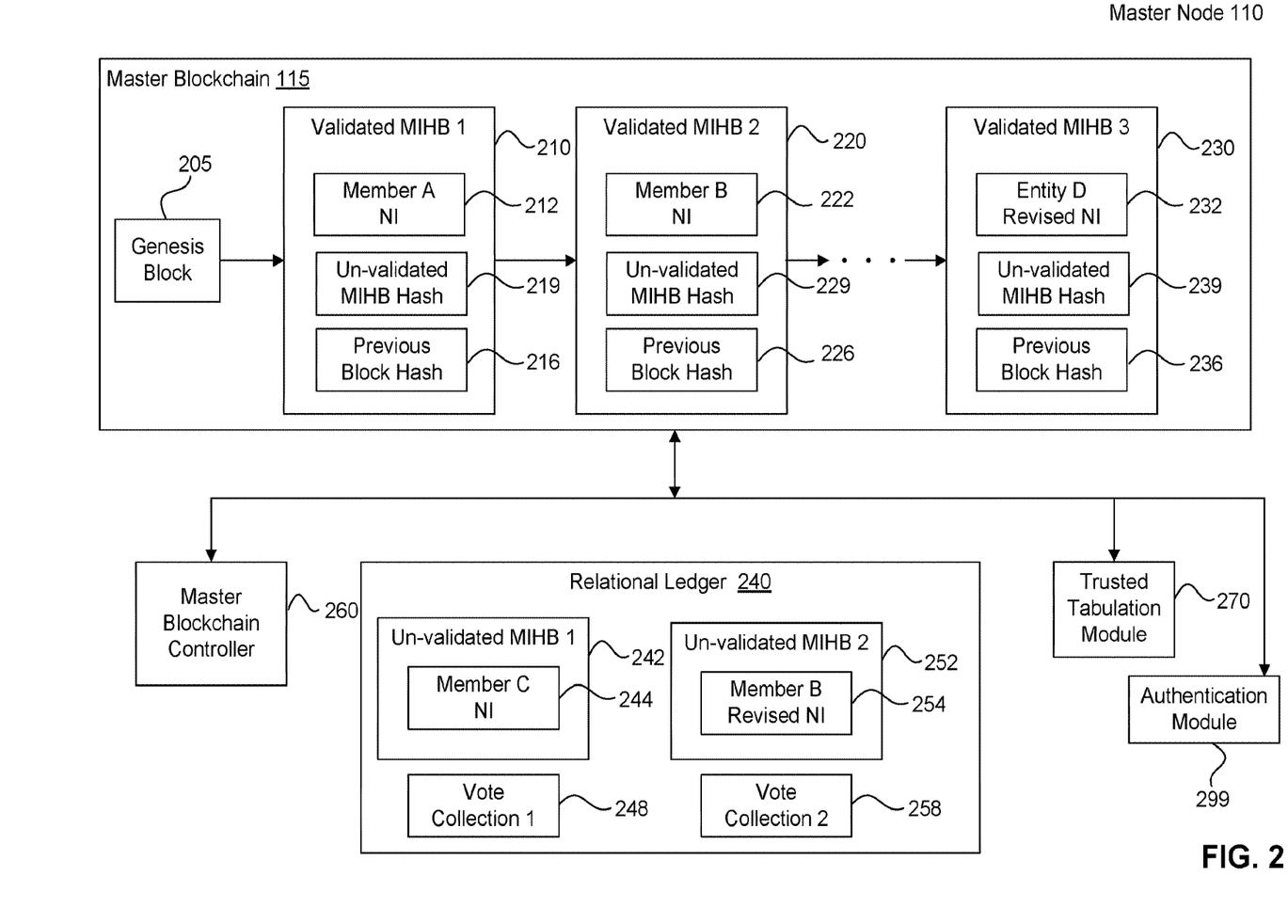
FIG. 2 shows a master node in accordance with one or more embodiments.

FIG. 2 shows an example master node, such as master node (110) of FIG. 1. As shown in FIG. 2, the master node (110) has multiple components including the master blockchain (115), a relational ledger (240), a master blockchain controller (260), an authentication module (299), and a trusted tabulation module (270). Each of these components may be implemented on the same computing device (e.g., server, mainframe, personal computer (PC), tablet PC, smartphone, etc.) or on multiple computing devices connected by wired and/or wireless channels.

The relational ledger (240) may be implemented as a relational database or as any other type of data structure, including its own blockchain ledger. As shown in FIG. 2, the relational ledger (240) stores one or more un-validated MIHB (e.g., un-validated MIHB 1 (242), un-validated MIHB 2 (252)). Each un-validated MIHB (242, 252) includes the NI of a member seeking validation or the revised NI of a member seeking to be revalidated. For example, assume member C is a new member seeking validation. Accordingly, un-validated MIHB 1 (242) includes the NI of member C (244). As another example, assume already-validated member B has revised its NI, such as changed its physical address. Accordingly, un-validated MIHB 2 (252) includes the revised NI of member B (254).

In one or more embodiments, each un-validated MIHB is generated by the authentication module (299). Accordingly, the authentication module (299) performs the operations, e.g., hashing, required to generate the un-validated MIHBs (242, 252).

In one or more embodiments, the relational ledger (240) also stores vote collections (e.g., vote collection 1 (248), vote collection 2 (258)) for each of the un-validated MIHBs (242, 252). The votes values in a vote collection (248, 258) are generated by users of validated members and may represent the confidence/trust these users have in the identities of the users of the un-validated member (or member seeking revalidation). Accordingly, these vote values may also represent, at least indirectly, the confidence/trust these user have in the accuracy and legitimacy of the NI or revised NI in the corresponding un-validated MIHB. For example, vote collection 1 (248) includes the vote values from various end users of validated members, where the vote values indicate whether one or more end users of un-validated member C can be trusted. In this example, the end users of un-validated member C have accumulated a sufficient number of votes indicated they are trustworthy, member C may be added to master blockchain 115 as a validated member. Alternatively, end users of validated members may vote on the un-validated member (e.g., member C) in addition to or in place of voting for the end user of the un-validated member. In one or more embodiments, users of validated members cast votes before, during, or after communication sessions with users of an un-validated member (e.g., member C) or of a validated member seeking revalidation (e.g., member B).

In one or more embodiments, the trust tabulation module (TTM) (270) is configured to calculate a trust score for each NI or revised NI in the un-validated MIHB blocks (242, 252) based on the vote values in the corresponding vote collections (248, 258). A trust score may be calculated by summing or averaging the vote values in the vote collection. Moreover, different weights may be assigned to the vote values of different users. Weights may be determined based on one or more of: how long the user has belonged to the member and how long the member has been validated (i.e., validation timestamp), the duration of the communication session between the user of the validated member and the user of the member seeking validation or revalidation, the type of the communication session, the distance between the user of the validated member and the user of the member seeking validation or revalidation, how frequently the user of the validated member votes, how frequently the user of the validated member initiates or participates in communication sessions, the network address of the user when voting, etc. The trust score may be updated as additional vote values are received. Moreover, the current trust score may be transmitted and displayed to a user of a validated member before, during, and/or after a communication session with a user of the member seeking validation or revalidation.

In one or more embodiments, the TTM (270) is also configured to execute a comparison between the calculated trust score and a trust threshold value. In one or more embodiments, if the trust score satisfies (e.g., equals or exceeds) the trust threshold value, the member corresponding to the un-validated MIHB is approved for validation or approved for revalidation in the case of a new member or a validated member with a revised NI, respectively.

As shown in FIG. 2, the master blockchain (115) has multiple blocks including a genesis block (205) and multiple validated MIHBs (e.g., validated MIHB 1 (210), validated MIHB 2 (220), validated MIHB 3 (230)). Each validated MIHB (210, 220, 230) may correspond to a validated or re-validated member. Each validated MIHB (210, 220, 230) may include the NI of the validated member (e.g., member A NI (212), member B NI (222)) or the revised NI of a revalidated member (e.g., member D revised NI (232)). Further, each validated MIHB (210, 220, 230) may include an un-validated MIHB hash (219, 229, 239). The un-validated MIHB hash (219, 229, 239) may be a hash generated from the corresponding trust score, generated by the TTM, and/or the associated block hash from the un-validated MIHB blockchain or unique database locater where such un-validated block was stored. Further still, each validated member block (210, 220, 230) may also include the hash of the previous (i.e., immediately preceding) block. In other words, previous block hash (216) is a hash of the genesis block (205). Similarly, previous block hash (226) is a hash of validated member block 1 (210). Further, previous block hash (236) is the hash of the validated member block (not shown) immediately prior to validated member block 3 (230). While the master blockchain 115 of FIG. 2 illustrates that each block records a single validated member, the master blockchain 115 is not so limited (e.g., each block may record more than one validated member). The blocks of master blockchain 115 may also record other information associated with validated members, such as information associated with the votes that the member received at the time it was added to the master blockchain 115.

In one or more embodiments, the genesis block (205) includes an identification string (not shown) formed from any relevant data including the name space of the communication network (100), date and time of network instantiation, a location of the communication network (100), a first creator identity, a MAC address of one or more routing or other machine elements in communication network (100), first member or members IDs of the communication network (100), etc. The genesis block (205) may also include a nonce.

In one or more embodiments, the master block controller (260) is configured to validate or re-validate a member by inserting a new validated MIHB corresponding to the member into the master blockchain (115). The new validated MIHB is generated based on the un-validated MIHB corresponding the member. In other words, the new validated MIHB includes the NI or revised NI from the corresponding un-validated MIHB and may include in its hashing input the corresponding trust score generated by the TTM and associated block hash from the un-validated MIHB blockchain or unique database locater where such un-validated block was stored. The new validated MIHB may also include the last validated block hash in the corresponding un-validated MIHB.

In one or more embodiments, the master block controller (260) is configured to effectively remove a member from the master blockchain (convert the member from validated to un-validated) by adding a block to the master blockchain (115) indicating that the member is un-validated. The master block controller (260) may un-validate the member for a variety of reasons. The reasons may include the member's then calculated trust score has fallen below the established trust value threshold to maintain a validated MIHB. This may arise, for example, from network usage inactivity, excessive or material changes in a member's NI information or other event triggers such as but not limited to receiving confirmation from one or more other member users that the subject member is engaged in fraud. The master blockchain may thus contain an immutable or tamper resistant record of the members and how the members are perceived in the community/industry.

Figure 3:
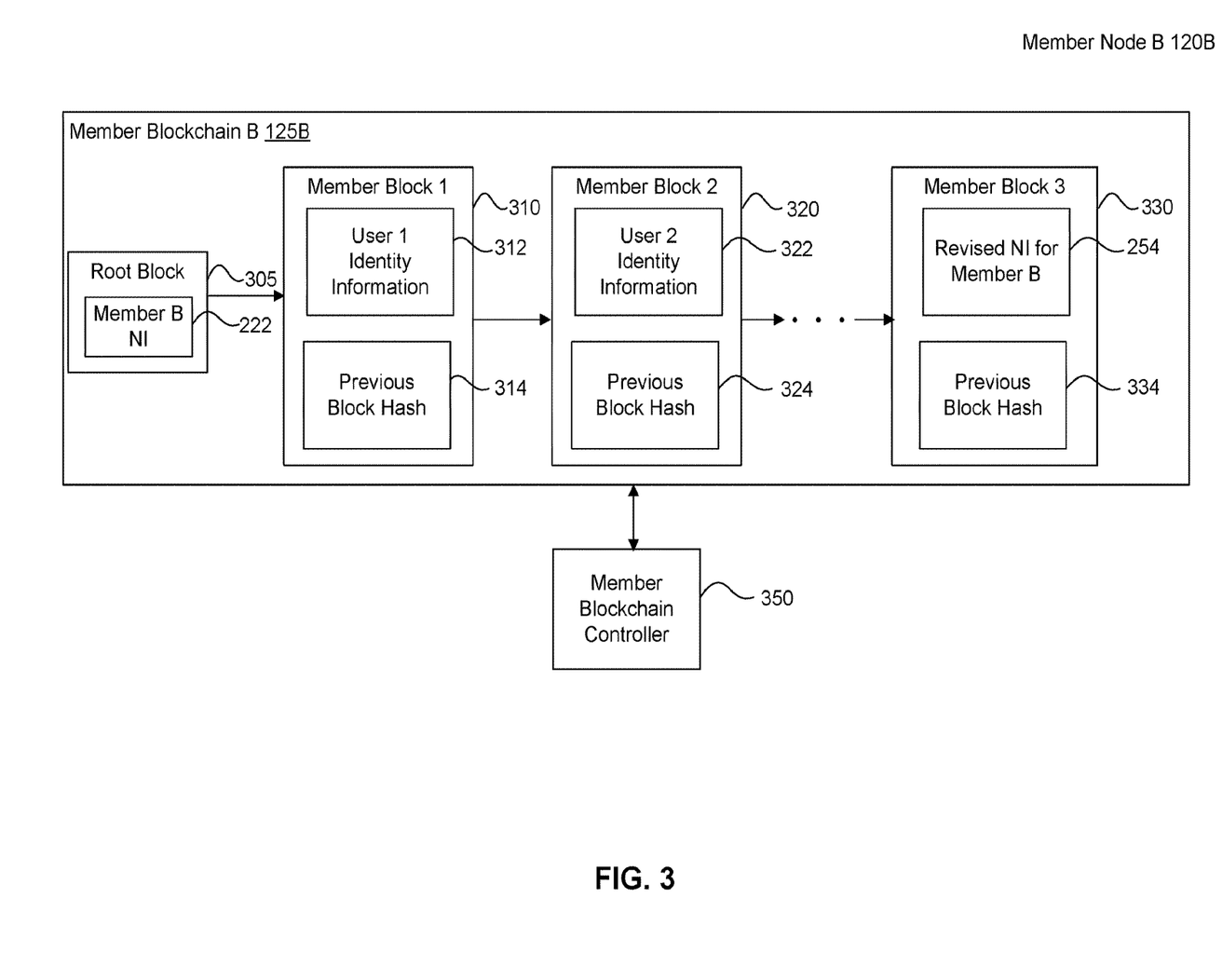
FIG. 3 shows a member node in accordance with one or more embodiments.

FIG. 3 shows member node B (120B) in accordance with one or more embodiments. As shown in FIG. 3, member node B (120B) has multiple components including member blockchain B (125B) and a member blockchain controller (350). Each of these components may be implemented on the same computing device (e.g., server, mainframe, personal computer (PC), tablet PC, smartphone, etc.) or on multiple computing devices connected by wired and/or wireless channels.

As shown in FIG. 3, the member blockchain B (125B) includes a root block (305) and multiple member blocks (e.g., member block 1 (310), member block 2 (320), member block 3 (330)). The root block (305) may include the NI for member B (222) (or the hash value of the NI for member B (222)) and a nonce (not shown). Each member block (310, 320, 330) may correspond to a user currently or previously belonging to member B and/or a revision to the NI of member B. For example, member block 1 (310) and member block 2 (320) correspond to users (e.g., user 1, user 2) belonging to member B. In contrast, member block 3 (330) corresponds to a revision to the NI for member B. While the member blockchain 125B of FIG. 2 illustrates that each block records a single end user, the member blockchain 125B is not so limited (e.g., each block may record more than end user, each block may record additional information about end users or member B, etc.).

In one or more embodiments, member blocks corresponding to a user include one or more identity attributes (e.g., name, email address, phone number, physical address, MAC address of computing device operated by user, IP address of user, etc.) of the user. Accordingly, member block 1 (310) and member block 2 (320) include the identity attributes of user 1 (312) and the identity attributes of user 2 (322), respectively. In one or more embodiments, member blocks corresponding to revised NI include the revised NI. Accordingly, member block 3 (330) includes the revised NI for member B (254). As shown in FIG. 3, each member block (310, 320, 330) may also include the hash of the previous (i.e., immediately preceding) block. In other words, previous block hash (314) is a hash of the root block (305). Similarly, previous block hash (324) is a hash of member block 1 (310). Further, previous block hash (334) is the hash of the member block (not shown) immediately prior to member block 3 (230).

In one or more embodiments, the member blockchain controller (350) is configured to generate and add the member blocks (310, 320, 330) to member blockchain B (125B). Further, the member block chain controller (350) may be configured to generate the root node (305) and start member blockchain B (125B). In one or more embodiments, the member blockchain controller (350) is configured to audit the blockchains of other members in order to identify the other members' end users, as discussed below.

Although FIG. 3 only shows member node B (120B), all member nodes (120A, 120C) may have components similar to those shown in FIG. 3. Further, although FIG. 3 shows member node B (120B) having only one member blockchain, in other embodiments, a member node may have multiple member blockchains (discussed below).

Figure 4:
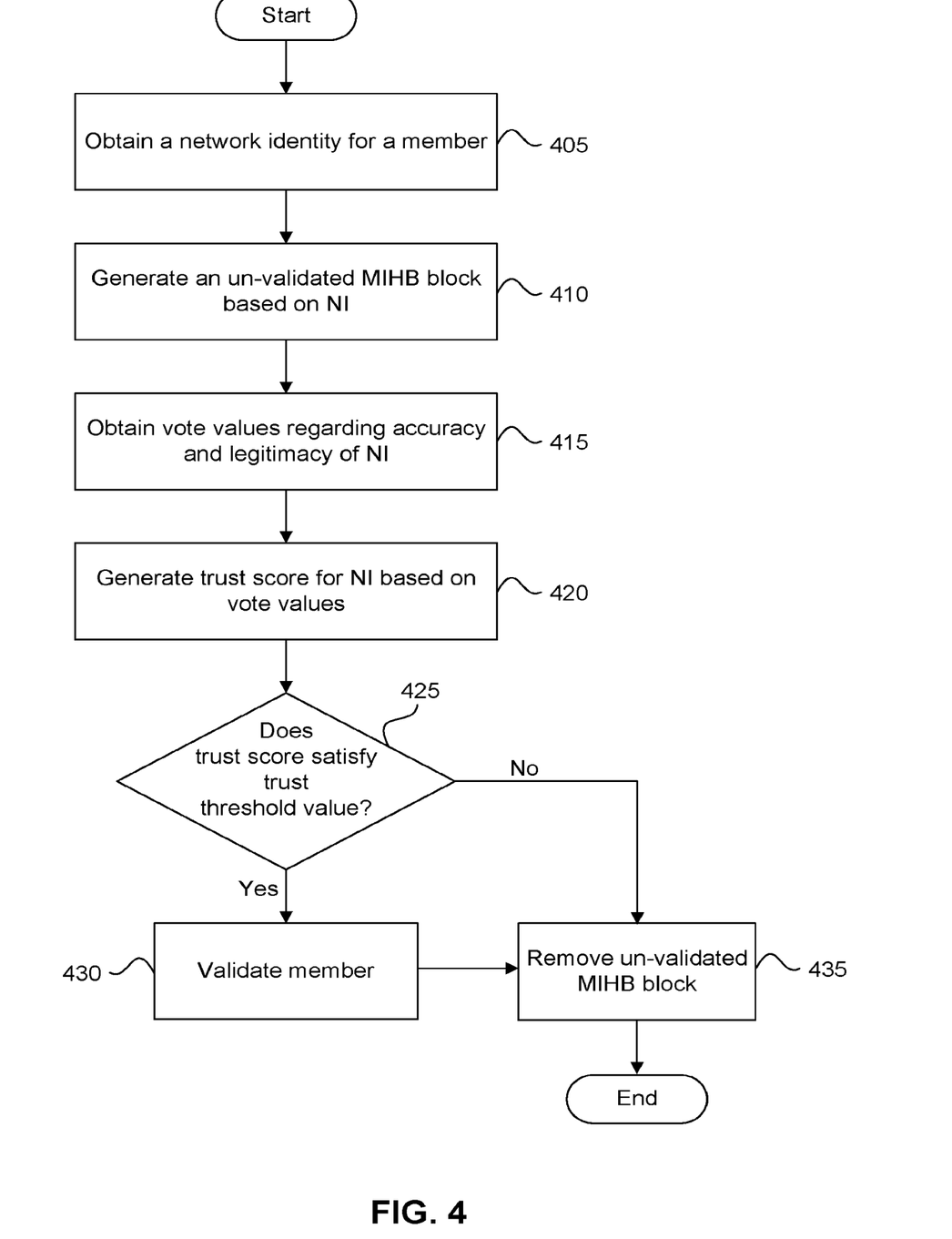
FIGS. 4-7 show flowcharts in accordance with one or more embodiments.

FIG. 4 shows a flowchart in accordance with one or more embodiments. The flowchart of FIG. 4 depicts a process for managing a communication network and/or validating members of the communication network. The process may be performed by one or more components of the master node (110), discussed above in reference to FIG. 1 and FIG. 2. In one or more embodiments, one or more of the steps shown in FIG. 4 may be omitted, repeated, and/or performed in a different order than the order shown in FIG. 4. Accordingly, the scope should not be considered limited to the specific arrangement of steps shown in FIG. 4. The steps shown in FIG. 4 may be implemented as computer-readable instructions stored on computer-readable media, where, when the instructions are executed, cause a processor to perform the process of FIG. 4.

Initially, a network identity (NI) of a member in the communication network is obtained (Step 405). The member may be un-validated and seeking validation. As discussed above, the NI may include one or more identifying attributes or contact information of the member, one or more unique validating attributes of the member, and/or one or more attributes necessary for the member to be part of the communication network.

In Step 410, an un-validated MIHB is generated for the member. The un-validated MIHB may include the NI of the member. The un-validated MIHB may also include a hash of the most recently appended block to the master blockchain for the communication network. The un-validated MIHB may be stored in a relational ledger.

In Step 415, vote values are obtained. In one or more embodiments, the vote values are generated by users belonging to validated members and represent the trust/confidence these users have in the identities of the users of the un-validated member. Accordingly, these vote values may also represent, at least indirectly, the confidence/trust these user have regarding the accuracy and legitimacy of the NI. End users belonging to validated members may cast the vote values before, during, or after communication sessions (e.g., email, phone calls, instant messaging, texting, file transfers, etc.) with end users of the un-validated member having the NI. The vote values may be stored in the relational repository and linked to the un-validated MIHB.

In Step 420, a trust score is generated for the un-validated member based on the vote values. The authentication score may be generated by summing or averaging the vote values. In one or more embodiments, vote values from different end users may be assigned different weights (discussed above).

In Step 425, it is determined whether the trust score satisfies (e.g., exceeds or equals) an trust threshold value. When it is determined that the trust score satisfies the trust threshold value, the un-validated member is approved for validation, and the process proceeds to Step 430. When it is determined that the trust score does not satisfy the trust threshold value, the un-validated member is not deemed approved for validation, and the process proceeds to Step 435.

In Step 430, the un-validated member is validated. Validating the member may include generating a validated MIHB and inserting the validated MIHB into the master blockchain ledger for the communication network. The validated MIHB may include all the content of the un-validated MIHB (e.g., NI of the network). The validated MIHB may also include a hash generated from the un-validated MIHB and/or the trust score. The validated MIHB may also include a hash of the previous (i.e., immediately preceding) block in the master blockchain ledger.

Upon reaching Step 435, either the un-validated member has been validated or the un-validated member was not approved for validation. Accordingly, in Step 435, the un-validated MIHB and any stored votes for the NI in the un-validated MIHB are removed from the relational ledger. Alternatively, the un-validated MIHB may remain in the relational ledger until it receives enough votes to be considered trusted and added to the master blockchain. Further, the un-validated MIHB may remain in the relational ledger for a predefined period, and removed if the member fails to receive enough votes to be considered trusted within the predefined period.

In one or more embodiments, the process depicted in FIG. 4 may be repeated for each member seeking validation. Further, those skilled in the art, having the benefit of this detailed description, will appreciate that the vote values from the users of other validated members and the trust score reduce the likelihood of a malicious or fraudulent member been inadvertently validated. This is an improvement to the technical fields of at least network access control and online authentication.

Figure 5:
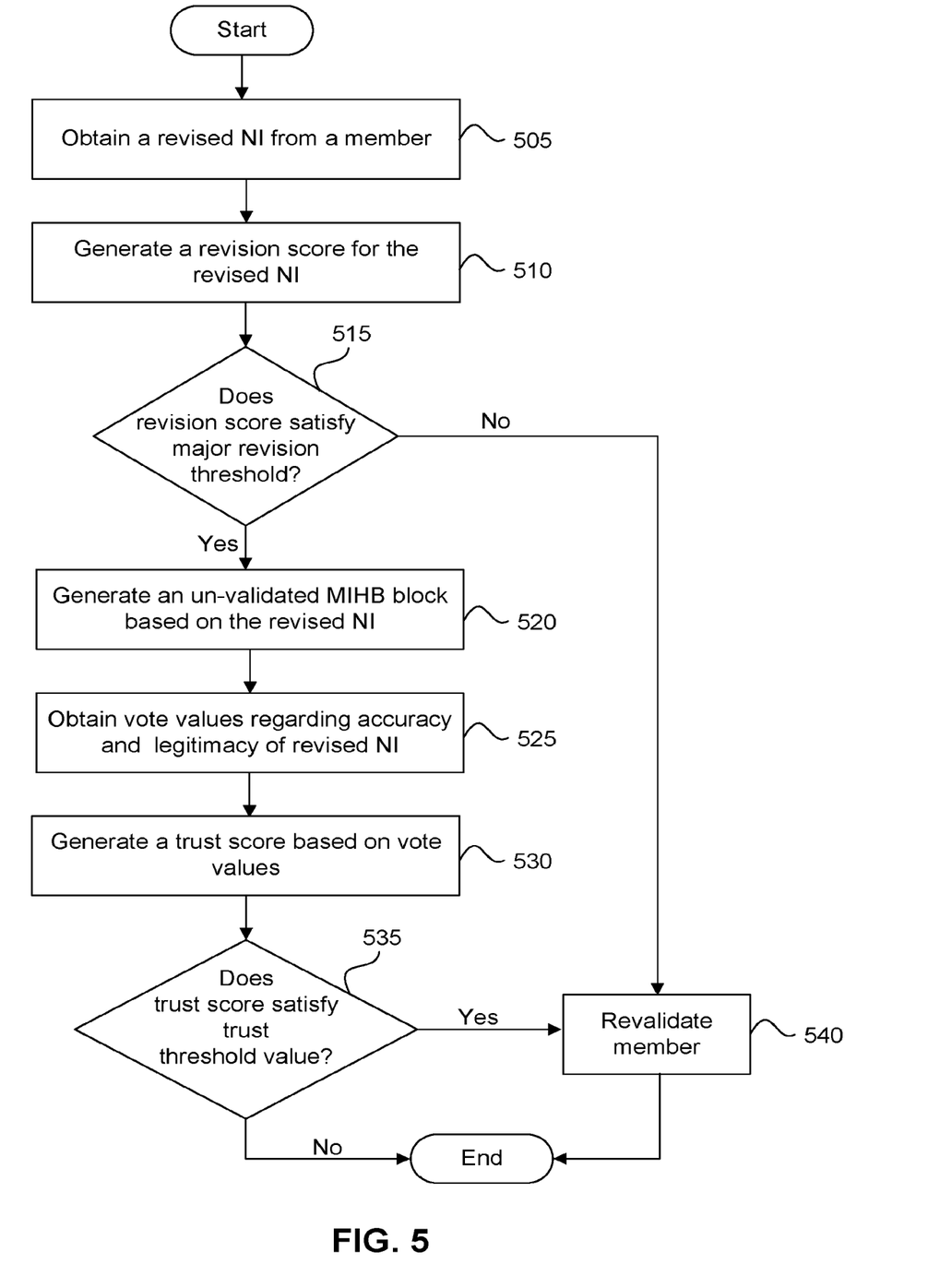

FIG. 5 shows a flowchart in accordance with one or more embodiments. The flowchart of FIG. 5 depicts a process for managing a communication network and/or revalidating members of the communication network. The process may be performed by one or more components of the master node (110), discussed above in reference to FIG. 1 and FIG. 2. In one or more embodiments, one or more of the steps shown in FIG. 5 may be omitted, repeated, and/or performed in a different order than the order shown in FIG. 5. Accordingly, the scope should not be considered limited to the specific arrangement of steps shown in FIG. 5. Moreover, one or more steps in FIG. 5 may be executed before or after the process depicted in FIG. 4. The steps shown in FIG. 5 may be implemented as computer-readable instructions stored on computer-readable media, where, when the instructions are executed, cause a processor to perform the process of FIG. 5.

In Step 505, a revised NI is obtained. The revised NI may be obtained from a validated member seeking revalidation. The revised NI may have one or more attributes that are different from the attributes in the original NI of the member (e.g., a change in the physical address of the member).

In Step 510, a revision score is generated for the revised NI. The revision score may reflect the magnitude of the changes between the original NI for the member (stored in the master blockchain) and the revised NI for the member. The revision score may be calculated by counting the number of attributes that changed between the original NI and the revised NI. Moreover, weights may be assigned to one or more of the attributes. In other words, some attributes are more important than others and when these important attributes are changed, this results in a higher revision score.

In Step 515, it is determined whether the revision score satisfies a major revision threshold. When it is determined that the revision score does not satisfy (e.g., is less than) the major revision threshold, the revised NI is considered to have minor revisions and the process proceeds to Step 540. When it is determined that the revision score does satisfy (e.g., equals or exceeds) the major revision threshold, the revised NI is considered to have major revisions and the process proceeds to Step 520.

In Step 520, an un-validated MIHB is generated for the member. The un-validated MIHB may include the revised NI. The un-validated MIHB may also include a hash of most recent block appended to the master blockchain ledger for the communication network. The un-validated MIHB may be stored in a relational ledger.

In Step 525, vote values are obtained. In one or more embodiments, the vote values are generated by users belonging to validated members and represent the trust/confidence these users have in the identities of the users of the member seeking revalidation. Accordingly, these vote values may also represent, at least indirectly, the confidence/trust these user have regarding the accuracy and legitimacy of the revised NI. Users belonging to other validated members may cast the vote values before, during, or after communication sessions (e.g., email, phone calls, instant messaging, texting, file transfers, etc.) with users of the member having the revised NI. These vote values may be relayed from the computing devices of the users to the master node of the communication network by the member nodes corresponding to the validated members. The votes may be stored in the relational ledger and linked to the un-validated MIHB.

In Step 530, a trust score is generated for the member seeking re-validation based on the vote values. The trust score may be generated by summing or averaging the vote values. In one or more embodiments, vote values from different users may be assigned different weights.

In Step 535, it is determined whether the trust score satisfies (e.g., exceeds or equals) an trust threshold value. When it is determined that the trust score satisfies the trust threshold value, the member is approved for revalidation, and the process proceeds to Step 540. When it is determined that the trust score does not satisfy the trust threshold value, the member is not deemed approved for revalidation, and the process may end.

In Step 540, the member is revalidated. Revalidating the member may include generating a validated MIHB and inserting the validated MIHB into the master blockchain ledger for the communication network. The validated MIHB includes at least the revised NI. The validated MIHB may also include a hash generated from the un-validated MIHB and/or the trust score. The validated MIHB may also include a hash of the previous (i.e., immediately preceding) block in the master blockchain ledger.

Those skilled in the art, having the benefit of this detailed description, will appreciate that when the revisions to the NI are minor, the process depicted in FIG. 5 allows the member to be revalidated without the need for the voting process. In other words, an accelerated revalidation path is provided when changes to the NI are minor. This accelerated revalidation path consumes fewer communication network resources than the regular validation process and eliminates traffic on the communication network (i.e., increases bandwidth) that would otherwise by consumed by transmitting vote values from the users.

Figure 6:
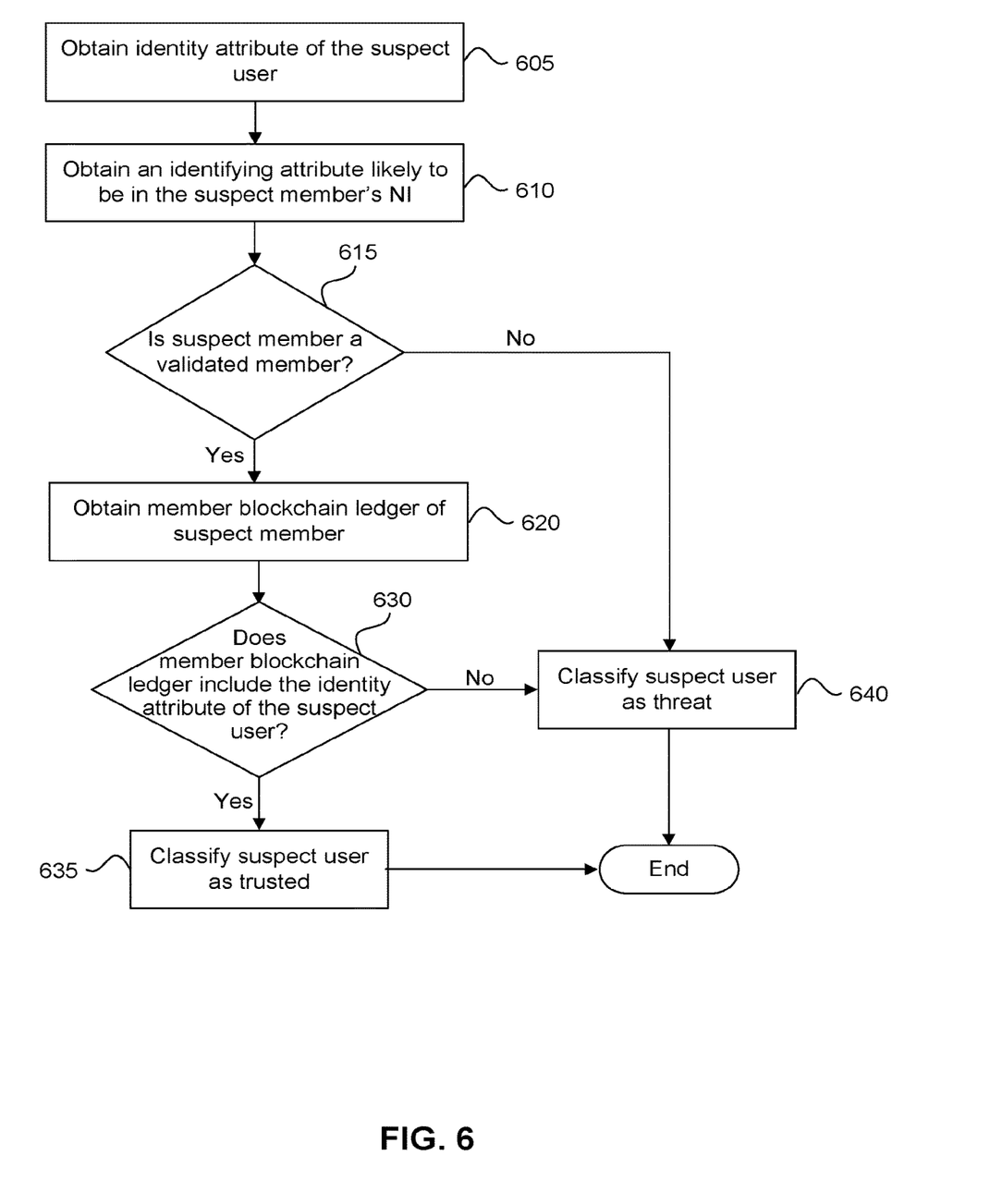

FIG. 6 shows a flowchart in accordance with one or more embodiments. The flowchart of FIG. 6 depicts a process for managing a communication network and/or classifying/authenticating a suspect end user (e.g., an unknown end user) in the communication network. The process may be performed by one or more components of the master node (110) and/or a member node (120A, 120B, 120C), discussed above in reference to FIG. 1, FIG. 2, and FIG. 3. In one or more embodiments, one or more of the steps shown in FIG. 6 may be omitted, repeated, and/or performed in a different order than the order shown in FIG. 6. Accordingly, the scope should not be considered limited to the specific arrangement of steps shown in FIG. 6. Moreover, one or more steps in FIG. 6 may be executed before or after the process depicted in FIG. 4 or in FIG. 5. The steps shown in FIG. 6 may be implemented as computer-readable instructions stored on computer-readable media, where, when the instructions are executed, cause a processor to perform the process of FIG. 6.

In one or more embodiments, when an end user attempts to initiate (or successfully initiates) a communication session (e.g., email, phone call, texting, instant messaging, file transfers, etc.) with another end user, the user initiating the communication session may be referred to as a suspect user (or an unknown end user). The other end user may be referred to as the non-suspect user (or a known end user, such as an end user employed by a validated member). Additionally or alternatively, a first end user may wish to authenticate a second end user before initiating or consenting to a communication session with the second end user. In such scenarios, the first end user and the second end user may also be referred to as the non-suspect end user and the suspect end user, respectively. Moreover, the member to which a suspect end user belongs (or allegedly belongs) may be referred to as a suspect member, while the member to which the non-suspect end user belongs may be referred to as a non-suspect member.

Initially, an identity attribute (e.g., name, username, email address, phone number, physical address, MAC address of computing device operated by suspect user, IP address of suspect user, etc.) of the suspect end user is obtained (Step 605). The identity attribute of the suspect end user may be extracted from communication (e.g., email headers, network packets, phone calls, text messages, instant messages, etc.) with the suspect end user. The extraction may be executed by the computing device operated by the non-suspect end user and/or by the member node corresponding to the non-suspect member.

In Step 610, one or more identifying attributes likely to be in the suspect member's NI are obtained. Like the identity attribute of the suspect user, the identity attribute(s) for the suspect member may be extracted from communication from the suspect user. Additionally or alternatively, the identity attribute(s) may be requested from the suspect member directly.

In Step 615, it is determined whether the suspect member is a validated member based on the identifying attributes of the suspect member. In other words, it is determined whether the master blockchain ledger includes a validated MIHB storing an NI with the identifying attributes of the suspect member. In one or more embodiments, this determination includes traversing the master blockchain in search of the matching NI (i.e., the NI with the identifying attributes of the suspect member). The master node may traversed the master blockchain upon request from the non-suspect end user and/or the non-suspect member. Additionally or alternatively, the member node corresponding to the non-suspect member may obtain a copy of the master blockchain ledger and execute the traversal. When it is determined that the suspect member is a validated member, the process proceeds to Step 620. When it is determined that the suspect member is an un-validated member, the process proceeds to Step 640.

In Step 620, the member blockchain ledger of the suspect member is obtained. In one or more embodiments, the non-suspect user and/or the non-suspect member may request the member blockchain ledger directly from the suspect member. The non-suspect end user and/or non-suspect member may utilize contact information from the matching NI to contact the suspect member and request the member blockchain.

In Step 630, it is determined whether the member blockchain ledger includes the identity attribute of the suspect end user. In other words, it is determined whether the suspect end user is a user currently belonging to the suspect member. This determination may involve the non-suspect end user or member node of the non-suspect member traversing the member blockchain in search of a block corresponding to a current user and having the identity attribute of the suspect end user. When it is determined that the suspect user is a current end user belonging to the suspect member, the process proceeds to Step 635. When it is determined that the suspect user is not a current end user (i.e., the identity attribute of the suspect user is missing from the member blockchain), the process may proceed to Step 640. While traversing the member blockchain, if the identity attribute is found in a block corresponding to a previous end user (e.g., terminated employee, graduated student, etc.) belonging to the suspect member, the suspect end user is deemed not to be a valid or trusted end user.

In Step 635, the suspect end user is classified as trusted because the suspect end user belongs to a validated member (as verified by traversing the master blockchain ledger) and the member blockchain ledger for the validated member includes the identity attribute of the suspect user. This classification may be reported (e.g., displayed) to the non-suspect end user. The non-suspect end user can now initiate/participate in a communication session with the suspect end user because the suspect end user has been authenticated.

In Step 640, the suspect end user is classified as a threat or as untrusted because the suspect member is un-validated and/or the member blockchain ledger did not have the identity attribute(s) of the suspect member. This classification may be reported (e.g., displayed) to the non-suspect end user. The non-suspect end user may refuse or terminate a communication session with the suspect end user and/or be cautious not to share confidential information with the suspect end user until the suspect user can be authenticated.

Those skilled in the art, having the benefit of this detailed description, will appreciate that by using multiple levels/tiers of blockchains, along with the immutable properties of an individual blockchain, a more secure user authentication/classification can be executed. This is a technical improvement to at least the fields of network access control and online authentication.

Figure 7:
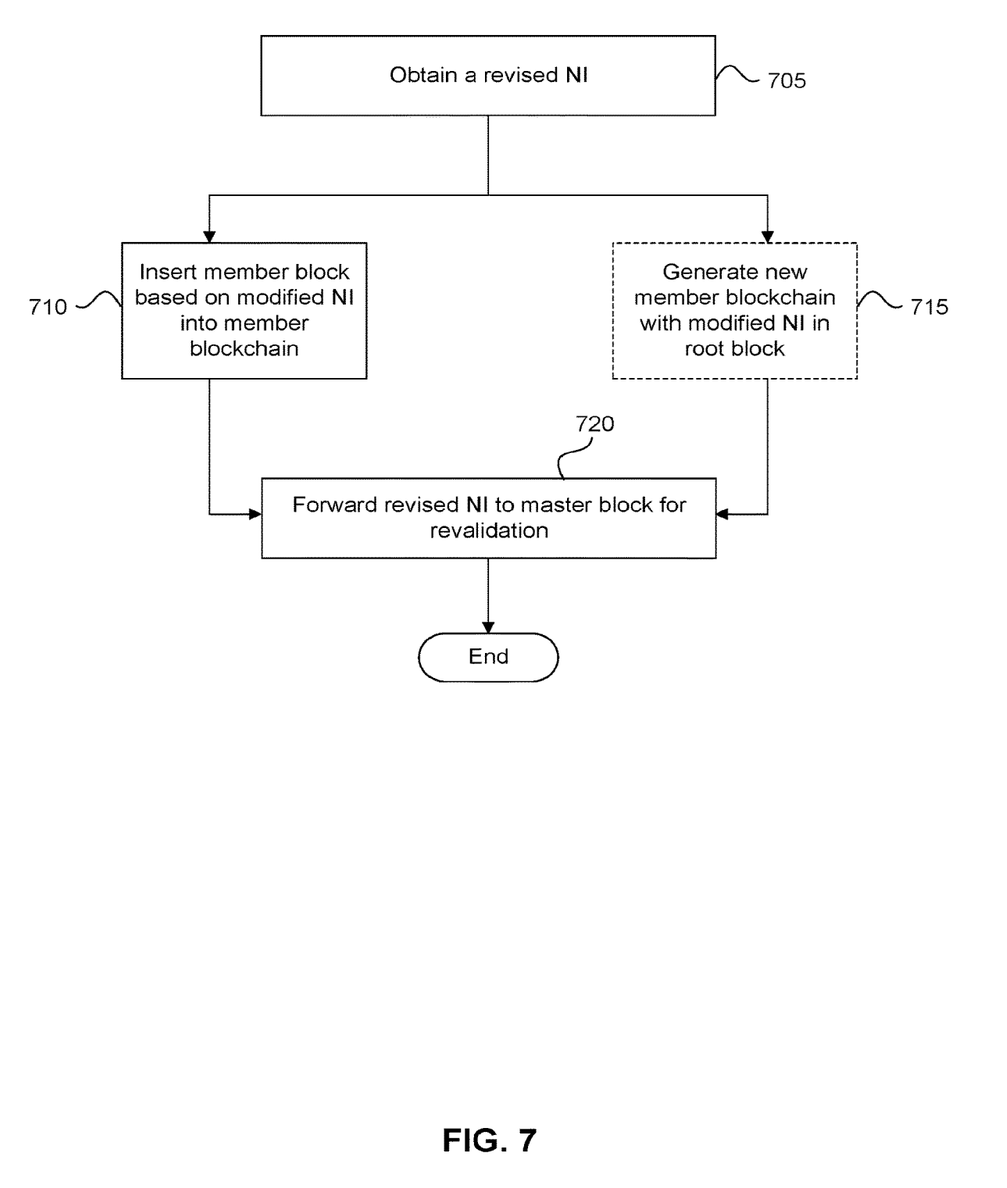

FIG. 7 shows a flowchart in accordance with one or more embodiments. The flowchart of FIG. 7 depicts a process for managing a communication network and/or revising the NI of a member in the communication network. The process may be performed by one or more components of a member node (120A, 120B, 120C), discussed above in reference to FIG. 1 and FIG. 3. In one or more embodiments, one or more of the steps shown in FIG. 7 may be omitted, repeated, and/or performed in a different order than the order shown in FIG. 7. Accordingly, the scope should not be considered limited to the specific arrangement of steps shown in FIG. 5. Moreover, one or more steps in FIG. 7 may be executed before or after the processes depicted in FIG. 4-6. The steps shown in FIG. 7 may be implemented as computer-readable instructions stored on computer-readable media, where, when the instructions are executed, cause a processor to perform the process of FIG. 7.

Initially, a revised NI of a member is obtained (Step 705). A member may revise its NI because one or more attributes of the member have changed. For example, the member may have changed names, the member may have changed buildings, the member may have changed emails address or public IP address, etc.

In Step 710, a new block is inserted into the member blockchain ledger for the member. The new block includes the revised NI. As discussed above, the member blockchain ledger may also have member blocks corresponding to current and previous users belonging to the member. Moreover, the root block of the member blockchain ledger may include the original NI for the member.

In Step 720, the revised NI is sent to the master node to revalidate the member, as discussed above in reference to FIG. 5. Revalidation may occur when one or more pre-defined data position or field values of significance in the NI block are changed. The entire new block with the revised NI may be sent to the master node. Additionally or alternatively, just the revised NI may be sent to the master node. The data sent to the master node may be encrypted. The master node decrypts the revised block containing the NI and determines if any one or more changes of significance have been made. The master controller (260) may un-validate the member in response to the revised NI by adding a block to the master blockchain (115) indicating that the member is un-validated.

In one or more embodiments, Step 715 may be executed instead of Step 710. In Step 715, a new member blockchain ledger is generated for the member. The root block for the new member blockchain ledger includes, in the first instantiation, the hash value of the last block of the master network blockchain and the revised NI. Additionally or alternatively, the first block after the root block in the new member blockchain may be a replica of (or includes a pointer to) the last block of the existing member blockchain ledger. In one or more embodiments, a set of new blocks may be added to the new member blockchain ledger. The user identity information stored in the blocks of the existing member blockchain may be copied to the new blocks.

The parallel blockchain architecture disclosed herein, e.g., FIG. 1, increases the security of a communications network by ensuring an immutable record of relevant sub-users or member endpoints controlled and authenticated by the member and having access to the communication network under the root member network identity. The member network identity then logically links to the master blockchain ledger. This ensures that any other member of the network can first validate the identity of the member and then interrogate and validate any sub-user or endpoint entity through the master network blockchain ledger and then seek member blockchain block validation.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A system for a first member node in a communication network, comprising:
   a memory; and
   a computer processor coupled to the memory, configured to:
   validate a suspect member based on an identifying attribute of the suspect member being in a master blockchain ledger of the communication network;
   request a member blockchain ledger from the suspect member using contact information of the suspect member, wherein the master blockchain ledger comprises a network identifier of the suspect member, and wherein the network identifier of the suspect member comprises the contact information;
   obtain the member blockchain ledger of the suspect member;
   determine that the member blockchain ledger comprises an identity attribute of a suspect user associated with the suspect member; and
   classify, in response to the determination, the suspect user as trusted.

2. The system of claim 1, where in the computer processor is further configured to:
   obtain, from a first user of a first member corresponding to the first member node in the communication network, a vote value regarding a second user of a second member in the communication network, wherein the first member is validated and the second member is un-validated; and
   forward the vote value to a master node in the communication network comprising the master blockchain ledger, wherein the master node validates the second member based on the vote value by inserting, into the master blockchain ledger, a validated member identity hash block based on a network identifier of the second member.

3. The system of claim 1, wherein the computer processor is further configured to:
   insert a member block based on a new user of the first member into a member blockchain ledger of the first member;
   generate a revised network identifier for the first member in the communication network;
   insert a member block based on the revised network identifier for the first member into the member blockchain ledger; and
   forward the revised network identifier for the first member to a master node in the communication network comprising the master blockchain ledger, wherein the master node revalidates the first member by inserting a validated member identity hash block based on the revised network identifier for the first member into the master blockchain ledger.

4. The system of claim 1, wherein the computer processor is further configured to:
   generate a revised network identifier for the first member in the communication network;
   generate a member blockchain ledger comprising a root node comprising the revised network identifier for the first member; and
   forward the revised network identifier for the first member to a master node, wherein the master node revalidates the first member by inserting a validated member identity hash block based on the revised network identifier for the first member into the master blockchain ledger.

5. A non-transitory computer-readable medium storing instructions that, when executed by a processor of a master node, cause the master node to perform operations, the operations comprising:
   recording a first validated member identity hash block (MIHB) based on a network identifier (NI) of a first member into a master blockchain ledger;
   obtaining a revised NI for the first member;
   generating an un-validated MIHB based at least on a number of attributes that changed between the NI and the revised NI;
   obtaining a plurality of votes corresponding to the revised NI;
   generating a trust score based on the plurality of votes, wherein a first vote value is associated with a communication session between a first user of the first member and a second user of a second member of a communication network, wherein the first vote value is obtained from the second user, wherein the generating the trust score comprises assigning a weight to the first vote value based on the second user; and in response to the trust score satisfying a trust score threshold, recording a second validated MIHB based on the revised NI into the master blockchain ledger.

6. The non-transitory computer-readable medium of claim 5, wherein the weight is based on a distance between the first user and the second user.

7. The non-transitory computer-readable medium of claim 5, the operations further comprising:
generating a second trust score for the second member;
validating the second member in response to the second trust score satisfying the trust score threshold;
obtaining a second vote value for the second member after validating the second member;
updating the second trust score based on the second vote value; and
un-validating the second member in response to the second trust score no longer satisfying the trust score threshold.

8. The non-transitory computer-readable medium of claim 7, the operations further comprising:
transmitting a copy of the master blockchain ledger to a member node of the communication network after un-validating the second member, wherein the master blockchain ledger is located in the master node of the communication network; and
classifying, based on the copy, a suspect user associated with the second member as a threat after un-validating the second member.

9. The non-transitory computer-readable medium of claim 7, wherein validating the second member comprises inserting a third validated MIHB for the second member into the master blockchain ledger.

10. The non-transitory computer-readable medium of claim 7, wherein un-validating the second member comprises inserting a block into the master blockchain ledger indicating the second member is un-validated.

11. The non-transitory computer-readable medium of claim 5, the operations further comprising:
extracting an internet protocol (IP) address or a MAC address of a computing device from a member block of a member blockchain ledger of the first member, and an identity attribute of the first member from a network packet sent by the computing device;
determining that the first member is validated based on the first validated MIHB in the master blockchain ledger comprising the identity attribute extracted from the network packet;
determining that the member blockchain ledger comprises the IP address or the MAC address of the computing device extracted from the network packet;
based on the determinations, classifying the computing device as trusted; and
participating in a communication session with the computing device in response to the computing device being classified as trusted.

12. The non-transitory computer-readable medium of claim 5, the operations further comprising:
storing in a relational ledger, a first un-validated MIHB comprising the network identifier;
generating the first validated MIHB based on the first un-validated MIHB;
storing in the relational ledger, a second un-validated MIHB comprising the revised network identifier; and
generating the second validated MIHB based on the second un-validated MIHB.

13. The non-transitory computer-readable medium of claim 5, wherein the weight is based on a voting frequency of the second user.

14. The non-transitory computer-readable medium of claim 5, wherein the weight is based on a duration of the communication session.

15. A method for a master node, comprising:
storing an un-validated member identity hash block (MIHB) comprising a network identifier for a first member of a communication network, wherein the first member is un-validated and associated with a first user;
obtaining a vote value regarding the first user from a second user of a second member in the communication network, wherein the second member is validated;
generating a trust score for the network identifier based on the vote value, wherein the network identifier comprises a physical address of the first member and a public IP address of the first member;
comparing the trust score with a trust score threshold; and
validating the first member, in response to the trust score satisfying the trust score threshold, wherein the validating comprises inserting a validated MIHB for the first member into a master blockchain ledger of the master node.

16. The method of claim 15, wherein the validated MIHB comprises a hash of the un-validated MIHB and the trust score, and wherein the vote value is based on a communication session between the first user and the second user.

17. The method of claim 15, wherein the generating trust score comprises assigning a weight to the vote value based on a validation date of the second member in the communication network.

18. The method of claim 15, further comprising:
comparing, after the trust score is updated, the trust score with the trust score threshold; and
un-validating the first member, in response to the trust score no longer satisfying the trust score threshold.

19. The method of claim 18, wherein the un-validating comprises inserting a block into the master blockchain ledger of the master node indicating that the first member is un-validated.

20. The method of claim 15, wherein the generating the trust score comprises assigning a weight to the vote value based on a frequency of the second user initiating communication sessions.

* * * * *